US008238870B2

(12) United States Patent
Xing et al.

(10) Patent No.: US 8,238,870 B2
(45) Date of Patent: Aug. 7, 2012

(54) METHOD AND DEVICE FOR TRANSMITTING EMERGENCY BROADCAST MESSAGE

(75) Inventors: Xing Xing, Shenzhen (CN); Yong Lv, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 12/942,250

(22) Filed: Nov. 9, 2010

(65) Prior Publication Data

US 2011/0053550 A1  Mar. 3, 2011

Related U.S. Application Data

(63) Continuation of application No. PCT/CN2008/002120, filed on Dec. 29, 2008.

(30) Foreign Application Priority Data

May 14, 2008  (CN) .......................... 2008 1 0096992

(51) Int. Cl.
H04M 11/04  (2006.01)
(52) U.S. Cl. ........... 455/404.1; 379/37; 379/40; 379/41; 379/51; 455/404.2
(58) Field of Classification Search .................... 379/37, 379/40, 41, 47, 51; 455/90.1, 404.1, 404.2, 455/412.1, 418, 521
See application file for complete search history.

(56) References Cited

U.S. PATENT DOCUMENTS

| 5,797,091 | A  | * | 8/1998  | Clise et al. ............... 455/404.2 |
|---|---|---|---|---|
| 6,745,021 | B1 | * | 6/2004  | Stevens .................... 455/404.1 |
| 7,224,957 | B2 | * | 5/2007  | Spector .................... 455/404.2 |
| 7,558,558 | B2 | * | 7/2009  | Langsenkamp et al. ... 455/404.1 |
| 7,617,287 | B2 | * | 11/2009 | Vella et al. ................. 709/207 |
| 8,010,164 | B1 | * | 8/2011  | Sennett et al. .............. 455/567 |
| 2005/0197112 | A1 | * | 9/2005 | Yang et al. .................. 455/418 |

FOREIGN PATENT DOCUMENTS

| CN | 1774083 A | * | 5/2006 |
|---|---|---|---|
| CN | 1848973 A | * | 10/2006 |

* cited by examiner

*Primary Examiner* — Jean Gelin
*Assistant Examiner* — Michael S Bush
(74) *Attorney, Agent, or Firm* — Christopher P. Maiorana, PC

(57) ABSTRACT

A method for transmitting emergency broadcast message is disclosed in the present invention. The method comprises the following steps: setting an emergency broadcast message transmitting group in a terminal, and adding a user name and/or a telephone number of a receiving user of an emergency broadcast message to the emergency broadcast message transmitting group; after the terminal receives the emergency broadcast message via the broadcast communication system, extracting the phone number or the user name from the emergency broadcast message transmitting group and transmitting an emergency broadcast message in the mode of short message to the receiving user corresponding to the phone number or user name. The method makes the terminals which do not have the function of directly receiving an emergency broadcast message be able to receive the emergency broadcast message, through transmitting the emergency broadcast message received by the terminal which is able to directly receive the emergency broadcast message to the terminals which cannot receive the emergency broadcast message directly from the emergency broadcast system in the mode of short message, therefore achieves the objective of notifying the emergency broadcast message quickly and widely.

9 Claims, 1 Drawing Sheet

METHOD AND DEVICE FOR TRANSMITTING EMERGENCY BROADCAST MESSAGE

This is a continuation of International Application PCT/CN/2008/002120, with an International Filing Date of Dec. 29, 2008, which claims priority to Chinese Application No. 200810096992.7, filed May 14, 2008, each of which is incorporated by reference.

FIELD OF THE INVENTION

The present invention relates to the field of mobile multimedia broadcast, and more particularly to a method and device for transmitting emergency broadcast message.

BACKGROUND ART

In the recent years, digital mobile multimedia broadcast technologies and standards have been developing rapidly, for example the Digital Video Broadcast Handheld (DVB-H) in Europe, the Media Forward Link Only (MediaFLO) in US and the China Mobile Multimedia Broadcasting (CMMB) in China, etc. The digital mobile multimedia broadcast may provide terminal users with various service contents such as programs of advertisement, weather forecast, news, sports program, arts, multimedia broadcast play and movie; the user may select to watch his favorite service program of mobile multimedia broadcast.

Emergency broadcast is a method for notifying the public of emergency by using a broadcast communication system. When the emergencies such as natural catastrophe, accident disaster, public health and social safety cause or might cause heavy casualties, property damage, ecological damage and serious social harm, and endanger public safety, the emergency broadcast provides a rapid and efficient notification mode. When the above cases occur, a terminal installed with an emergency broadcast message receiving chip may receive the emergency broadcast message transmitted by the emergency broadcast system.

In the prior art, it is necessary for the terminal to install the emergency broadcast message receiving chip when the emergency broadcast system is used for transmitting the emergency broadcast message to the terminal; only the terminal installed with the emergency broadcast message receiving chip has the capability for receiving the emergency broadcast message directly, while the terminal without the emergency broadcast message receiving chip installed does not have the capability of directly receiving the emergency broadcast message, and can not receive the emergency broadcast message transmitted by the emergency broadcast system. In the case that mobile phone manufacturers reduce production costs unceasingly, the emergency broadcast message receiving chip is generally not installed in the currently-produced mobile phone, which causes that most terminals are unable to receive the emergency broadcast message transmitted by the emergency broadcast system in case of the occurrence of an emergency.

SUMMARY OF THE INVENTION

The technical problem to be solved in the present invention is to provide a method and device for transmitting emergency broadcast message, so that a terminal without the capability of receiving an emergency broadcast message transmitted by an emergency broadcast system directly may also receive the emergency broadcast message.

To solve the above technical problem, the method for transmitting emergency broadcast message of the present invention comprises the following steps:

setting an emergency broadcast message transmitting group in a terminal, and adding a user name and/or a telephone number of a receiving user of an emergency broadcast message to the emergency broadcast message transmitting group;

after receiving the emergency broadcast message via a broadcast communication system, the terminal extracting the telephone number or the user name from the emergency broadcast message transmitting group, and transmitting an emergency broadcast message in the mode of short message to the receiving user corresponding to the telephone number or the user name.

Preferably, when extracting the user name from the emergency broadcast message transmitting group, the terminal inquiring the telephone number corresponding to the user name from a phonebook, and transmitting the emergency broadcast message to the receiving user corresponding to the user name by using of the telephone number.

Preferably, after receiving the emergency broadcast message and displaying, the terminal prompting the user of the terminal whether to forward the emergency broadcast message by turning on a prompting window, after the user confirms to forward, extracting the telephone number or the user name from the emergency broadcast message transmitting group.

Preferably, after the user of the terminal confirms to forward, the terminal further parsing the document type of the received emergency broadcast message; if the document type is a text type, forwarding the emergency broadcast message in the mode of text short message; if the document type is sound, video or image type, forwarding the emergency broadcast message in the mode of multimedia message.

Preferably, a device for transmitting emergency broadcast message, comprises an emergency broadcast message receiving chip and an emergency broadcast message forwarding processing module; wherein, the emergency broadcast message receiving chip is configured to receive an emergency broadcast message and store the emergency broadcast message;

the emergency broadcast message forwarding processing module is configured to set an emergency broadcast message transmitting group, and add a user name and/or a telephone number of a receiving user of an emergency broadcast message to the emergency broadcast message transmitting group; further configured to receive the a forwarding confirmation command of the user, extract the emergency broadcast message from the emergency broadcast message receiving chip, and extract the telephone number or the user name from the emergency broadcast message transmitting group, and transmit the emergency broadcast message in the mode of short message to the receiving user corresponding to the telephone number or the user name.

Preferably, when extracting the user name from the emergency broadcast message sending group, the emergency broadcast message forwarding processing module inquires the telephone number corresponding to the user name from the phonebook, and transmits the emergency broadcast message to the receiving user corresponding to the user name by using of the telephone number.

Preferably, the device further comprises an information displaying unit, the emergency broadcast message receiving chip is further configured to transmit the received emergency broadcast message to the information displaying unit;

the information displaying unit is configured to display the received emergency broadcast message, and notify the emergency broadcast message forwarding module the display of the emergency broadcast message is completed when the user selects to close the display;

the emergency broadcast message forwarding processing module is further configured to prompt the user of the terminal whether to forward the emergency broadcast message by turning on a prompting window after receive a emergency broadcast message displaying completion notification, and extracting the telephone number or the user name from the emergency broadcast message transmitting group after the user confirms to forward.

Preferably, the emergency broadcast message forwarding processing module is further configured to parse the document type of the received emergency broadcast message after receiving a forwarding confirmation command, if the document type is text type, forwarding the emergency broadcast message in the mode of text short message if the document type is sound, video or image type, forwarding the emergency broadcast message in the mode of multimedia message.

To sum up, in accordance with the present invention, the emergency broadcast message received by the terminal having the capability of receiving an emergency broadcast message directly is transmitted to the terminal without the capability of receiving an emergency broadcast message directly from the emergency broadcast system in the mode of short message, so that the terminal without the capability of receiving an emergency broadcast message directly may also receive the emergency broadcast message, so as to achieve the objective of notifying the emergency broadcast message rapidly, efficiently and completely.

BRIEF DESCRIPTION OF THE ACCOMPANYING DRAWINGS

DETAILED DESCRIPTION OF THE INVENTION

In accordance with the present invention, the emergency broadcast message received by the terminal having the capability of receiving an emergency broadcast message directly is transmitted to the terminal without the capability of receiving an emergency broadcast message directly in the mode of short message, so as to achieve the objective of notifying the emergency cases rapidly, efficiently and completely.

The embodiments will be described hereinafter with reference to the accompanying drawings.

Figure 1:
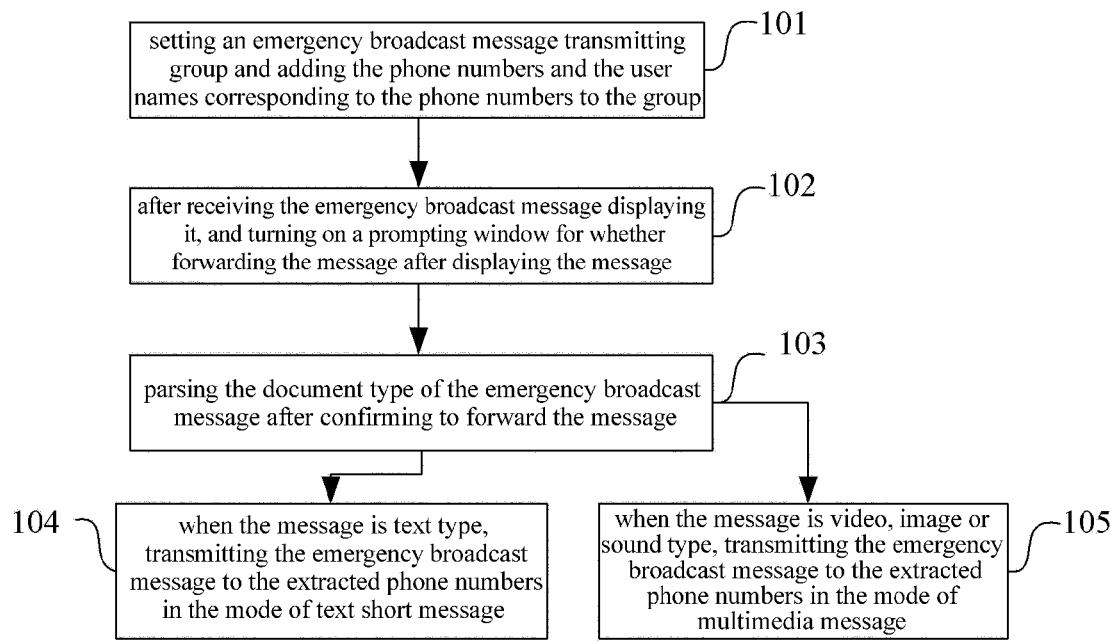
FIG. 1 is a flowchart of the method for transmitting emergency broadcast message in accordance with the present invention.

FIG. 1 is a flowchart of the method for transmitting emergency broadcast message in accordance with the present invention. The method comprises the following steps.

101: setting an emergency broadcast message transmitting group in a terminal, and adding phone numbers to which emergency broadcast messages are transmitted to and the user names corresponding to the phone numbers to the emergency broadcast message transmitting group;

The user may add comparatively important telephone numbers without the capability of receiving an emergency broadcast message and the user names corresponding to the telephone numbers to the emergency broadcast message transmitting group according to the importance of telephone number and the case whether the user of a telephone number has the capability of receiving an emergency broadcast message.

The user may also select to delete the above users from the emergency broadcast message transmitting group when the telephone number of the emergency broadcast message transmitting group is not important or the changed mobile phone may also receive an emergency broadcast message directly.

When adding a telephone number and a user name corresponding to the telephone number to the emergency broadcast message transmitting group, the number and the user name corresponding to the number may be inputted directly or a telephone number stored in a phonebook may be selected, which then are added to the emergency broadcast message transmitting group. When selecting the number from the phonebook, the telephone number selected from the phonebook and the user name corresponding to the telephone number may be copied directly to the emergency broadcast message transmitting group.

102: after receiving the emergency broadcast message, the terminal displays the emergency broadcast message and stores it as a local document; when the user selects to close the displayed emergency broadcast message, the terminal turns on a prompting window for "whether forwarding the emergency broadcast message";

103: the terminal parses the document type of the stored emergency broadcast message after the user confirms to forward the emergency broadcast message;

When the user cancels forwarding the emergency broadcast message, the forwarding is canceled and the method is ended.

104: when the document type of the emergency broadcast message is a text type, the telephone number is extracted from the emergency broadcast message transmitting group, and the stored emergency broadcast message is transmitted to the extracted phone numbers in the mode of text short message;

105: when the document type of the emergency broadcast message is sound, video or image type, the telephone number is extracted from the emergency broadcast message transmitting group, and the stored emergency broadcast message is transmitted to the extracted phone numbers in the mode of multimedia message.

When the emergency broadcast message transmitting group includes more than one telephone numbers, the emergency broadcast message may be transmitted to the telephone numbers of the emergency broadcast message transmitting group one by one or simultaneously in the mode of group-sending.

Served as another embodiment of the present invention, the user name for retransmitting an emergency broadcast message is only stored in the emergency broadcast message transmitting group; when the user confirms to forward the emergency broadcast message, the user name is extracted from the emergency broadcast message transmitting group, and the telephone number corresponding to the user name is queried from the phonebook according to the user name; the emergency broadcast message is transmitted to the queried telephone number in the mode of text short message or multimedia message according to the document type of the emergency broadcast message. By using the above mode, the telephone number corresponding to the user name may not be stored in the emergency broadcast message transmitting group; the telephone number stored in the phonebook may be directly used, which saves the memory space.

Figure 2:
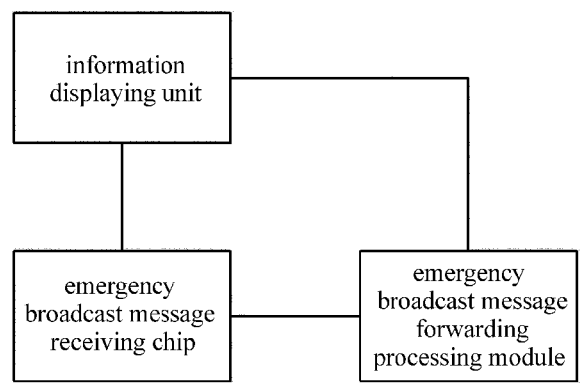
FIG. 2 is a structure diagram of the device for transmitting emergency broadcast message in accordance with the present invention.

FIG. 2 is a structure diagram of the device for transmitting emergency broadcast message in accordance with the present invention. The device comprises an emergency broadcast message receiving chip, an emergency broadcast message forwarding processing module and an information displaying unit; wherein, the emergency broadcast message receiving chip is configured to receive an emergency broadcast message, and transmit the received emergency broadcast message to the information displaying unit and store the message;

the emergency broadcast message forwarding processing module is configured to set an emergency broadcast message transmitting group, and add to the emergency broadcast message transmitting group a telephone number to which an emergency broadcast message is transmitted and/or the user name corresponding to the telephone number;

the emergency broadcast message forwarding processing module is further configured to prompt the user whether to forward the emergency broadcast message by turning on a prompting window after receive the emergency broadcast message displaying completion notification, and receive the selecting command of the user;

When receiving the forwarding confirmation command of user, the emergency broadcast message is extracted from the emergency broadcast message receiving chip, and the document type is parsed from the extracted emergency broadcast message; if it is a text type, when the emergency broadcast message transmitting group comprises the telephone number to which an emergency broadcast message is transmitted, the telephone number is extracted from the emergency broadcast message transmitting group; the emergency broadcast message is sent to the extracted telephone number in the mode of text short message; if it is sound, video or image type, the emergency broadcast message is transmitted to the extracted telephone number in the mode of multimedia message;

When the emergency broadcast message transmitting group only includes a user name, the telephone number corresponding to the user name is queried from the phonebook according to the user name; the received emergency broadcast message is forwarded to the queried telephone number in the mode of text short message or multimedia message according to the parsed document type of emergency broadcast message.

The information displaying unit is configured to display the received emergency broadcast message, and notify the emergency broadcast message forwarding module the display of the emergency broadcast message is completed when it is configured to select to close the displayed emergency broadcast message.

Obviously, the present invention may include other embodiments; those skilled in the art can make modification and alteration to the present invention without departing from the spirit and the essence of the invention, thus the modification and alteration should be covered in the protection scope of the claims of the present invention.

What is claimed is:

1. A method for transmitting emergency broadcast message, comprising the following steps:

setting an emergency broadcast message transmitting group in a terminal with the capability of receiving an emergency broadcast message directly, and adding a user name and/or a telephone number of a receiving user without the capability of receiving an emergency broadcast message directly of an emergency broadcast message to the emergency broadcast message transmitting group; and the following steps performed by the terminal with the capability of receiving an emergency broadcast message directly: after receiving the emergency broadcast message via a broadcast communication system, extracting the telephone number or the user name from the emergency broadcast message transmitting group, and transmitting the emergency broadcast message in the mode of short message to the receiving user, corresponding to the telephone number or the user name, without the capability of receiving an emergency broadcast message directly, wherein the emergency broadcast transmitting group comprises a list of one or more user names and/or telephone numbers of receiving users without the capability of receiving an emergency broadcast message directly and wherein receiving users not included in the emergency broadcast transmitting group are capable of receiving the emergency broadcast message directly.

2. The method according to claim 1, wherein when extracting the user name from the emergency broadcast message transmitting group, the terminal inquiring the telephone number corresponding to the user name from a phonebook, and transmitting the emergency broadcast message to the receiving user corresponding to the user name by using the telephone number.

3. The method according to claim 2, wherein after receiving and displaying the emergency broadcast message, the terminal prompting the user of the terminal whether to forward the emergency broadcast message by turning on a prompting window, and after the user confirms to forward, extracting the telephone number or the user name from the emergency broadcast message transmitting group.

4. The method according to claim 1, wherein after receiving and displaying the emergency broadcast message, the terminal prompting the user of the terminal whether to forward the emergency broadcast message by turning on a prompting window, and after the user confirms to forward, extracting the telephone number or the user name from the emergency broadcast message transmitting group.

5. The method according to claim 4, wherein after the user of the terminal confirms to forward, the terminal further parsing the document type of the received emergency broadcast message, if the document type is a text type, forwarding the emergency broadcast message in the mode of text short message;

if the document type is sound, video or image type, forwarding the emergency broadcast message in the mode of multimedia message.

6. A device for transmitting emergency broadcast message, comprising an emergency broadcast message receiving chip and an emergency broadcast message forwarding processing module; wherein the emergency broadcast message receiving chip is configured to receive an emergency broadcast message and store the emergency broadcast message;

the emergency broadcast message forwarding processing module is configured to set an emergency broadcast message transmitting group, and add a user name and/or a telephone number of a receiving user without the capability of receiving an emergency broadcast message directly of an emergency broadcast message to the emergency broadcast message transmitting group; and the emergency broadcast message forwarding processing module is further configured to receive a forwarding confirmation command of the user, extract the emergency broadcast message from the emergency broadcast message receiving chip, and extract the telephone number or the user name from the emergency broadcast message transmitting group, and transmit the extracted emergency broadcast message in the mode of short message to the receiving user, corresponding to the telephone number or the user name, without the capability of receiving an emergency broadcast message directly, wherein the emergency broadcast transmitting group comprises a list of one or more user names and/or telephone numbers of receiving users without the capability of receiving an emergency broadcast message directly and wherein receiving users not included in the emergency broadcast transmitting group are capable of receiving the emergency broadcast message directly.

7. The device according to claim 6, wherein when extracting the user name from the emergency broadcast message sending group, the emergency broadcast message forwarding processing module inquires the telephone number corresponding to the user name from a phonebook, and transmits the emergency broadcast message to the receiving user corresponding to the user name by using the telephone number.

8. The device according to claim 6, wherein the device further comprising an information displaying unit, the emergency broadcast message receiving chip is further configured to transmit the received emergency broadcast message to the information displaying unit;

the information displaying unit is configured to display the received emergency broadcast message, and notify the emergency broadcast message forwarding module the display of the emergency broadcast message is completed when the user selects to close the display;

the emergency broadcast message forwarding processing module is further configured to prompt the user of the terminal whether to forward the emergency broadcast message by turning on a prompting window after receiving an emergency broadcast message display completion notification, and extract the telephone number or the user name from the emergency broadcast message transmitting group after the user confirms to forward.

9. The device according to claim 6, wherein the emergency broadcast message forwarding processing module is further configured to parse the document type of the received emergency broadcast message after receiving a forwarding confirmation command, if the document type is text type, forwarding the emergency broadcast message in the mode of text short message;

if the document type is sound, video or image type, forwarding the emergency broadcast message in the mode of multimedia message.

* * * * *